Sept. 16, 1952　　　　L. W. WILSON　　　　2,611,005
AUTOMATIC IMPEDANCE RECORDER
Filed Jan. 14, 1949　　　　　　　　　　　　2 SHEETS—SHEET 1
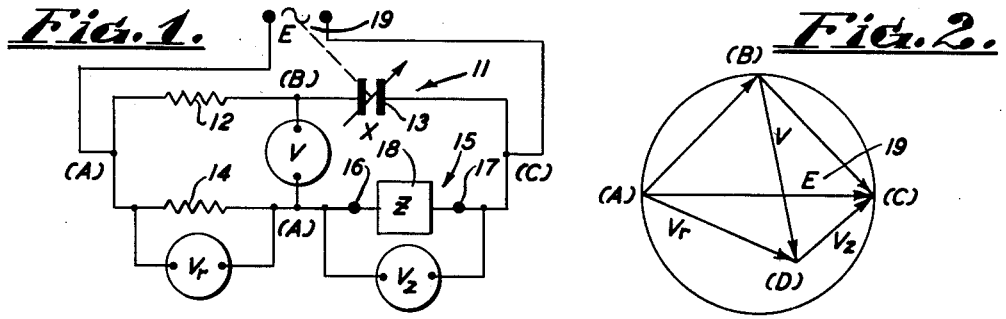
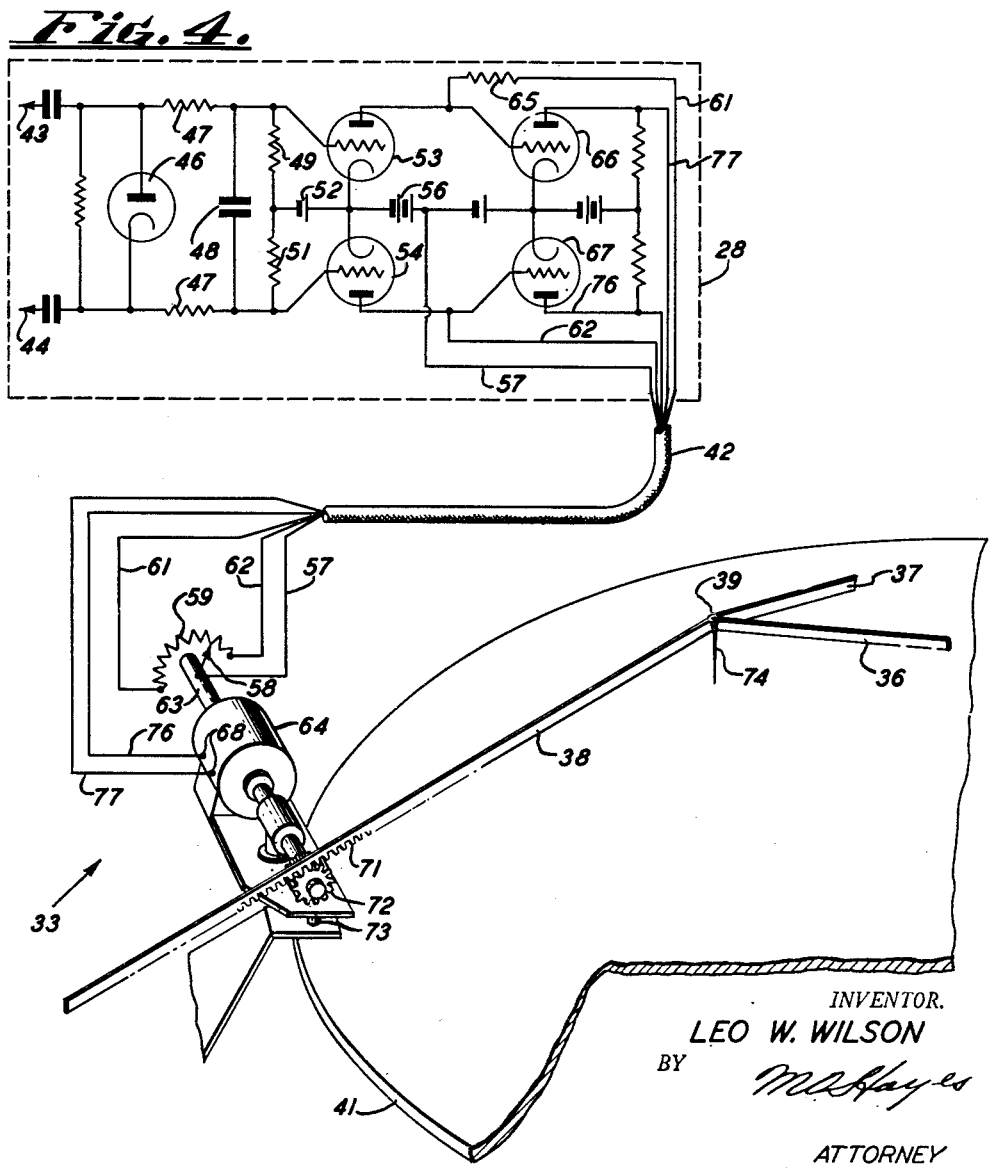
INVENTOR.
LEO W. WILSON
BY M. L. Hayes
ATTORNEY

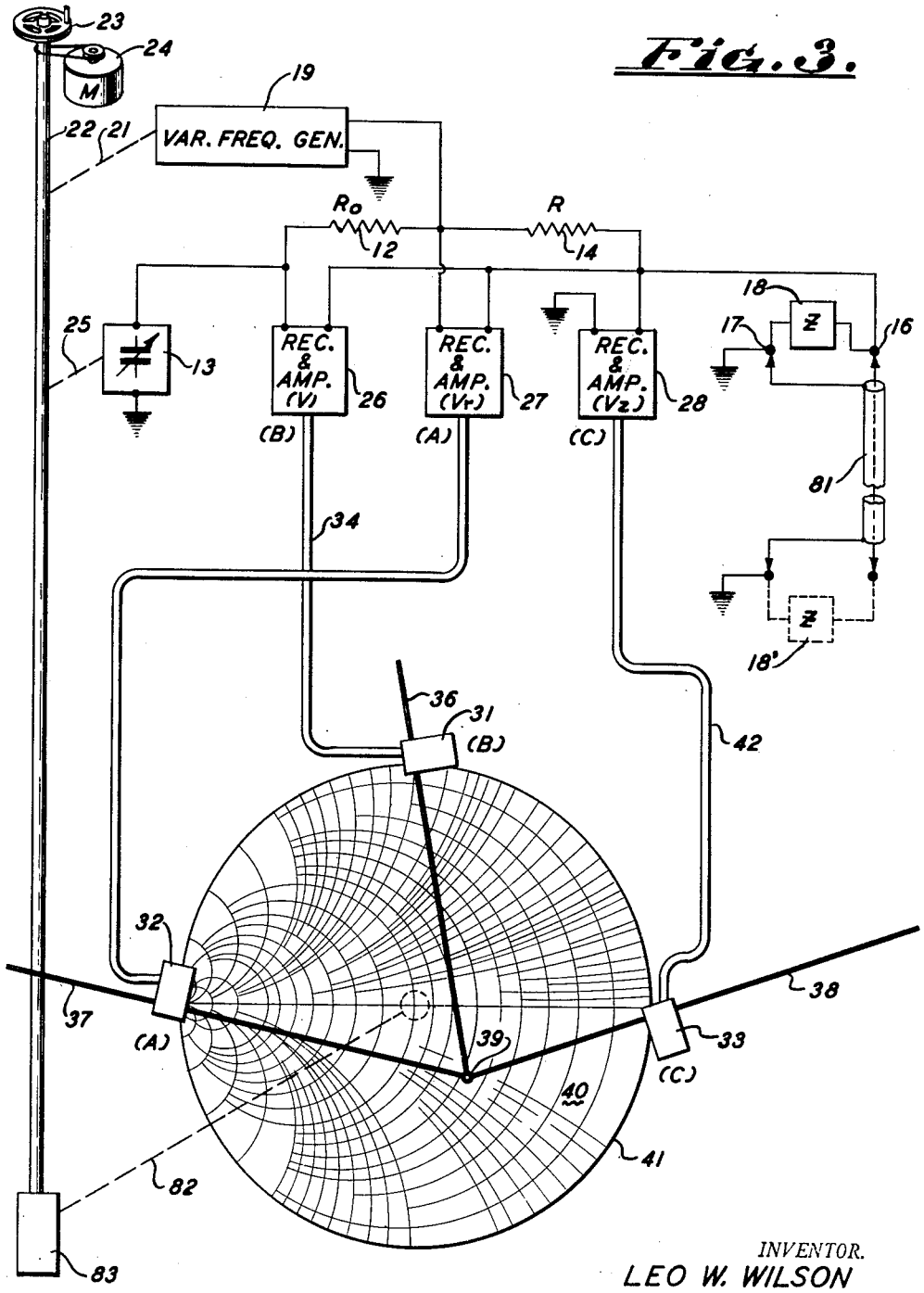

Patented Sept. 16, 1952

2,611,005

UNITED STATES PATENT OFFICE 2,611,005

AUTOMATIC IMPEDANCE RECORDER

Leo W. Wilson, San Diego, Calif.

Application January 14, 1949, Serial No. 71,001

8 Claims. (Cl. 175—183)

(Granted under the act of March 3, 1883, as amended April 30, 1928; 370 O. G. 757)

This invention relates to apparatus for measuring the magnitude and phase of an unknown impedance; and more particularly to apparatus for measuring and plotting the magnitude and phase of an unknown impedance over a continuously variable frequency sweep. The plotting of the impedance is done on an impedance chart known as a Smith chart, which will be referenced more particularly hereinafter.

It is an object of this invention to provide apparatus for directly plotting the magnitude and phase of an unknown impedance on an impedance chart.

It is another object of this invention to measure magnitude and phase of an unknown impedance over a continuously variable frequency range.

It is a further object of this invention to establish a measuring circuit in which an unknown impedance may be connected, and from which certain voltages may be derived that are uniquely indicative of the value of the unknown impedance.

It is a further object of this invention to provide means for plotting directly on a Smith chart the magnitude and phase of an unknown impedance over a range of frequencies.

Other objects and many of the attendant advantages of this invention will be readily appreciated as the same becomes better understood by reference to the following description.

The instant invention includes a bridge circuit fed with a source of frequency modulated A. C. voltage. The bridge circuit is adapted to include the unknown impedance to be measured. A plurality of voltage responsive means are connected electrically across different points of the circuit, and means are provided for combining the voltage responses of these means to indicate the value of the unknown impedance.

In the preferred form of the invention the value of the impedance is indicated on an impedance chart by means of a stylus controlled through driving means responsive to the above mentioned voltage combining means. The driving means preferably assumes the form of a plurality of arms, in this case three, the ends of which are connected together over the stylus. Each arm is mounted to and driven reciprocably from a suitable mechanism pivotally mounted at the edge of the chart table or surface. Each driving means, at the edge of the surface, serves to extend its arm in proportion to the instantaneous magnitude of the respective voltages appearing within the bridge circuit.

An important characteristic of the bridge circuit of the instant invention lies in the fact that one of the members of the bridge circuit is a substantially pure reactance, which is linked to a sweep frequency means in such manner that when the sweep frequency means causes the source voltage of the bridge to sweep thru its frequency spectrum, the reactance member is automatically adjusted so that its reactance is continuously maintained constant.

Specifically, the bridge circuit of the instant invention comprises a first branch and a second branch; the first branch includes a first resistor and a reactor in series, while the second branch includes, in series, a second resistor and the unknown impedance to be measured. The branches are connected in parallel across a source of variable frequency voltage. Means are provided for sweeping the source voltage thru its frequency range, and a link is connected to the reactor, so that its reactance is continuously maintained substantially constant over the swept frequency range.

Three voltage responsive means are connected respectively: (1) across the second resistor, (2) across the unknown impedance; and (3) between the respective midpoints of the two branches. These three voltages responsive means are used to energize the pivotally mounted reciprocable arms which are spaced around the edge of the chart table, so that each arm is extended or retracted in such manner that its effective length corresponds to the particular one of the three voltages by which it is energized. In this way, the three arms correspond to three vectors, vectorially combined by being joined at the stylus at the end of the arm; the net result is the plotting of the magnitude and phase of the unknown impedance on the chart carried by the table.

Under certain circumstances it may be inconvenient to connect the impedance within the bridge itself; in this case, a calibrated transmission line may be inserted between the impedance terminals in the bridge and the impedance itself. This transmission line has the effect of angularly shifting the readings obtained on the chart. To compensate for this shift, which varies with the frequency, the chart table is pivotally mounted and is driven thru suitable step-down gearing from the frequency sweeping source. As the voltage source is swept over its frequency range, the chart is steadily rotated, thereby compensating for the effect of the transmission line. When the transmission line is not used, the chart is maintained fixed.

A particular embodiment of the invention described generally above will now be described in detail with reference to the accompanying drawings, wherein:

Fig. 1 is a circuit diagram of the bridge portion of the instant invention;

Fig. 2 is a vector diagram showing the relationship of the voltages in the circuit of Fig. 1;

Fig. 3 is a schematic diagram of the complete measuring and charting apparatus of the instant invention; and Fig. 4 is a circuit and schematic diagram illustrating one of the three voltage responsive means used to drive the stylus actuating arm.

Referring to Fig. 1, 11 represents the first branch of the bridge circuit consisting of a resistor 12 connected in series with a reactor, in this case, a variable capacitor 13. A second branch 15 is connected in parallel with the branch 11, and consists of another resistor 14, connected in series with a pair of facing terminals 16 and 17, adapted to be connected to the two terminals of the unknown impedance 18. Across the entire bridge circuit, i. e., between the juncture point of the resistors 12 and 14, and the capacitor 13 and terminal 17, is connected a variable frequency source of voltage 19.

Turning now to Fig. 2, the vector diagram of the voltages appearing within the bridge circuit of Fig. 1 will be readily apparent. The voltage vector E of the source 19 constitutes the sum of the voltage $V_r$ appearing across the resistor 14, and the voltage $V_z$ appearing across the unknown impedance 18. The voltage vector E is also the sum of the voltage appearing across the resistor 12AB and the voltage appearing across the capacitor 13BC. The reactance magnitude, represented by the capacitor 13, is maintained constant and equal to the magnitude of the resistor 12, so that the voltage vectors AB and BC are always equal and 90° out of phase, as shown in Fig. 2, irrespective of the frequency of the voltage source 19.

Reference will now be made to an article appearing on pages 29, 30 and 31 of Electronics Magazine for January 1939, wherein there is described and illustrated an impedance plotting chart which has since come to be known as a Smith chart, after the author of the article. It can readily be shown by calculations, with which this specification will not be burdened, that the Smith chart is an unusually appropriate vehicle for representing the impedance 18, when the latter has been translated into the suitable voltages $V_r$, V, and $V_z$ of Fig. 2.

Let points A, B and C be located around the edge of the Smith chart at the points representing infinite resistance, unit negative reactance, and zero resistance, respectively. Extend from the point A a vector $V_r$ as shown in Fig. 2, equal in magnitude to the voltage appearing across the resistor 14. Extend from point B a vector V, equal in magnitude to the voltage appearing between the respective midpoints of the two branches 11 and 15 of the impedance bridge of Fig. 1. Finally, extend from point C a vector $V_z$ equal in magnitude to the voltage appearing across the unknown impedance 18. Join the extended ends of these three vectors at the point D, as shown in Fig. 2, and the location of the point D in Fig. 2, when placed on a Smith chart in the manner now being described will represent on said chart the magnitude and phase of the impedance 18.

There now remains the problem of resolving the three voltages $V_r$, V and $V_z$ into quantities which completely disregard respective phases of these voltages and which are responsive to the magnitude alone; and then to use these quantities to recreate the vectors $V_r$, V and $V_z$, extending from the three points A, B and C spaced around the edge of the Smith chart. This is done in the apparatus illustrated in Fig. 3.

Referring to Fig. 3, the bridge is shown consisting of the four members described above 13, 12, 14 and 18 respectively. They are energized by the source of variable frequency voltage 19, the frequency of which is swept back and forth by any suitable frequency varying means, shown schematically in this case simply by the dashed line 21, driven from a suitable linkage 22, controlled by a hand crank 23 or alternatively by a motor 24. The link 22 is also connected thru a suitable connection shown schematically by the dashed line 25 to the variable capacitor 13, so that as the hand crank 23 is rotated to sweep the voltage of the source 19 thru its frequency spectrum, the capacitance of the member 13 is also varied in such a way that the reactance thereof is maintained substantially constant. In this way, the relationship between the vector AB and the vector BC (Fig. 2) is maintained constant.

Three substantially identical rectifying and amplifying means 26, 27 and 28 are connected as shown to measure, respectively, the voltage V between the midpoints of the two branches 11 and 15, the voltage $V_r$ across the resistor 14, and the voltage V across the impedance 18. These voltages after rectification are employed to actuate servomotors in pivotally mounted voltage responsive means 31, 32 and 33, respectively. For example, the rectifier amplifier 26 is connected by means of a multi-conductor cable 34 to the voltage responsive means 31, which includes a servomotor, connected to extend and retract an arm 36, reciprocably mounted in the device 31, so that the length of the arm 36 which is extended from the device 31 is directly proportional to the magnitude of the A. C. voltage received by the device 26; that is to say, to the magnitude of the voltage V (Fig. 1). The voltage responsive device 32 has a similar arm 37, and the voltage responsive device 33 has an arm 38. The three arms 36, 37 and 38 have their ends pivotally connected together at 39, and a suitable marking device, or stylus, is mounted beneath the pivot point 39, this stylus bearing against a circular Smith chart 40 secured to a table 41 around the edge of which the voltage responsive devices 31, 32 and 33 are located, 90° apart.

One of the voltage rectifying, amplifying, and responsive units will now be described; for example, the unit consisting of the rectifier-amplifier device 28, the cable 42, and the responsive unit 33 including the arm 38. It will be understood that the other two units are similar. Referring to Fig. 4, the unit 28 has its input terminals 43 and 44 connected, thru isolating capacitors, across a rectifier 46. Rectified voltage appearing across 46 is applied thru resistors 47 to a smoothing capacitor 48, and thence to a pair of equal series-connected resistors 49 and 51, the midpoint of which is connected thru a grid bias battery 52 to the cathodes of a pair of push-pull connected tubes 53 and 54. The other ends of the resistors 49 and 51 are connected to the grids of the tubes 53 and 54, so that rectified voltage is applied in opposite sense to the two tubes, rendering one more conductive while simultaneously rendering the other less conductive. Plate supply voltage from a battery 56 as applied to the two tubes 53 and 54 thru a conductor 57 connected to the slider 58 of a potentiometer 59. The potentiometer 59 is connected to form a plate load resistor for the two tubes 53 and 54, one end of the potentiometer being connected by a conductor 61 to the plate of the tube 53, the other end being connected by a conductor 62 to the plate of the tube 54. In series with the conductor 61 is a resistor 65 for a purpose to be described hereinafter.

It will be noted in Fig. 4 that the potentiometer 59 is connected in the circuit of the tubes 53 and 54 remotely by means of the multi-conductor cable 42, in order that the potentiometer 59 may be more easily driven from the shaft 63 of a small D. C. motor 64 constituting one of the elements of the voltage responsive device 33.

Voltage appearing at the respective plates of the tubes 53 and 54 is applied directly to the grid of a pair of opposed, or push-pull, tubes 66 and 67, the plates of which are connected to feed an energizing signal to the motor 64 thru the cable 42. When the voltage on the plate of the tube 66 is equal to that on the plate of the tube 67, then the voltage across the terminals 68 of the motor 64 is zero, and the shaft 63 stands still. Should a voltage appear across the terminals 68, in either positive or negative sense, then the shaft 63 turns either clockwise or counterclockwise depending on the polarity of the voltage applied.

The shaft 63 is also connected thru suitable drive mechanism, shown schematically in Fig. 4 as a pinion and rack, to position the arm 38. In the specific embodiment shown, the arm 38 is provided with rack teeth 71, meshing with a pinion 72 secured to the shaft 63 of the motor 64. The entire assembly constituting the voltage responsive device 33 is freely pivotally mounted on an axis located directly beneath the meshing point of the rack 71 and the pinion 72, and passing thru the circumferential boundary of the Smith chart, as shown schematically by a pivot post 73 in Fig. 4. This pivot post is located adjacent to the edge of the circular table 41 mounting the chart 40, the latter is marked by a stylus 74, secured immediately beneath the juncture pivot point 39 of the three arms 36, 37 and 38.

When the voltage applied to the device 28 (i. e. $V_z$) is zero, then there is negligible voltage drop across the resistors 49 and 51, and the tubes 53 and 54 are in equal conduction, so that the voltages applied to the grids of the tubes 66 and 67, respectively, are of equal magnitude. Thus the voltages appearing on the plates of the tubes 66 and 67, respectively, are equal in magnitude, and no voltage is applied across the terminals 68 of the motor 64. The arm 38 under this condition is retracted to a minimum length so that the stylus 74 rests at a position at the edge of the chart 40 corresponding to zero voltage for the vector $V_z$. The slider 58 is in its extreme counterclockwise position. Under this condition, the load resistance in the plate circuit of the tube 54 is the full magnitude of the potentiometer 59, and is equal to the load resistance in the plate circuit of the tube 53, which is the resistor 65. The push-pull circuit 28 is thus completely balanced and at rest.

Now assume a voltage appears on the terminals 43 and 44. This voltage is rectified in 46, and applied, one-half in positive sense to the grid of the tube 54, and the other half in the negative sense to the grid of the tube 53. This applies a negative signal to the grid of the tube 67, resulting in a positive signal at its plate, which applies a positive voltage to the conductor 76 attached to one of the terminals 68. In similar manner, the negative signal applied to the grid of the tube 53 appears as a negative signal on the conductor 77, connected to the other terminal 68. The voltage thus appearing across the motor 64 causes the shaft 63 to turn clockwise in Fig. 4, extending the arm 38 and moving the slider 58 clockwise across the face of the potentiometer 59. This latter movement readjusts the plate voltage at the plates of the tubes 53 and 54, until these two plate voltages are again made equal by virtue of the increased load resistance in the plate circuit of the tube 53, and the decreased load resistance in the plate circuit of the tube 54. Thus in spite of unequal grid voltages on the tubes 53 and 54, their plate voltages are brought to equality by virtue of the operation of the slider 58 on the potentiometer 59.

The net result is that arm 38 is extended a distance corresponding to the instantaneous magnitude of the AC voltage existing on the terminals 43 and 44.

The voltage responsive devices 31 and 32 operate in a manner similar to that described above for 33 so that the three arms 36, 37 and 38 uniquely determine the position of the stylus 74 on the chart 40, and thus cause the stylus to continuously occupy a position upon the surface of the chart corresponding to the magnitude and phase of the impedance at 18.

Under certain circumstances, it may not be convenient to introduce the unknown impedance 18 physically into the bridge circuit shown in Fig. 1. In such case a transmission line 81 (Fig. 3) may be connected across the terminals 16 and 17, with the load end thereof being connected to the unknown impedance shown as 18' in Fig. 3. The vector effect of the insertion of the transmission line 81 is to rotate the entire Smith chart 40 about its center, and the extent of this angular shift depending upon the frequency of the energy applied to the bridge circuit. To compensate for this angular shift, the chart table 41 may be pivotally mounted on an axis extending thru the center thereof, and connected by suitable linkages or shafts shown schematically by the dashed line 82 in Fig. 3, to the frequency determining linkage, or shaft 22. This is preferably done thru a ratio changing means such as a gear box 83, which may be adjusted for different lengths of transmission line 81 to give the requisite angular compensation.

*Operation*

The operation of the entire apparatus will now be briefly reviewed. Referring to Fig. 3, an unknown impedance 18 is connected across the terminals 16 and 17 of the bridge circuit, the other members of which are the variable capacitor 13 and the two resistors 12 and 14. The variable frequency voltage generator 19 is placed in operation, the frequency being determined by the particular position of the frequency sweep handwheel 23. The voltage from the generator 19 divides across the bridge members 13, 12, 14 and 18 in the manner shown in Fig. 2 causing the voltages V, $V_r$ and $V_z$ to be applied to the three devices 26, 27 and 28 respectively. These voltages, rectified, energize respective devices 31, 32 and 33 thereby causing the extensible arms 36, 37 and 38 to assume a position recreating the vector diagram of Fig. 2 with the pivot juncture 39 positioned on the Smith chart 40 at a point uniquely corresponding to the magnitude and phase of the impedance 18 at the particular frequency being generated at the moment by generator 19.

The turning of hand crank 23 sweeps the voltage generated by the generator 19 thru its frequency spectrum. This is done by links shown schematically at 22 and 21. Another link 25 continuously adjusts the capacitor 13 so that its reactance remains substantially constant over the varying frequency range.

In the general case, the impedance 18 continuously changes magnitude and phase as the frequency of the energy applied thereto changes. This causes changing voltages to be applied to the three devices 26, 27 and 28, which drive their respective responsive devices 31, 32 and 33 to approximately extend or retract the driven arms 36, 37 and 38. Thus the stylus 74, beneath the pivot point 39, is continuously moved to a position always corresponding to the magnitude and phase of the impedance 18, plotted on the Smith chart 40.

It is to be understood that for the capacitor 13 there may be substituted any substantially pure reactor, which may be so adjusted as to maintain substantially constant reactance with changing frequency.

It is to be further understood that the control devices, for example, as represented by the apparatus 28, 42, 33, may be duplicated by any known and suitable mechanism which will take an A. C. voltage and transform it into a proportionate signal capable of positioning an arm such as the arm 38 a distance directly proportional to the magnitude of the A. C. voltage applied.

Obviously, many modifications and variations of the present invention are possible in the light of the above teachings. It is, therefore, to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. Apparatus for measuring unknown impedance comprising a chart surface, a first branch and a second branch connected in parallel, said first branch including a first resistor and a reactor in series, said second branch including a second resistor and an open circuited transmission line in series, the open end of said line being adapted to be connected across an unknown impedance, a source of variable frequency voltage connected across said branches, means for sweeping said source voltage thru the frequency range thereof, a link connecting said sweep frequency means to said reactor thereby to maintain its reactance constant over the swept frequency range, three voltage responsive means connected, respectively, (1) across said second resistor, (2) across said transmission line, and (3) between the respective midpoints of said two branches, each said voltage responsive means including a body pivotally mounted at the edge of said chart surface, an arm reciprocably mounted in said body, a driving mechanism carried by said body and connected to said arm, and control means for said driving mechanism whereby the particular energizing voltage to which said voltage responsive means is connected is made effective to extend and retract said arm in proportion to the magnitude of the energizing voltage; a pivot pin pivotally connecting the three arms adjacent their extended ends, a stylus mounted on said pivot pin effective to mark a chart disposed on said surface; and a link connecting said sweep frequency means to said chart surface to rotate the same as the frequency of said voltage is swept over its range.

2. Apparatus according to claim 1, wherein said last mentioned link includes adjustable ratio means whereby the movement ratio between the turning of said chart surface and the sweeping of said sweep frequency means may be selectively adjusted.

3. Apparatus for measuring an unknown impedance, comprising a chart surface; a bridge circuit including a variable reactor and a first resistor connected in series across a source of variable frequency A. C. voltage; a second resistor connected to the junction point between said source and said first resistor, the other terminal of said source and the other terminal of said second resistor constituting, respectively, the connection terminals for the unknown impedance; means for sweeping said source voltage thru the frequency range thereof; a link connecting said sweep frequency means to said reactor thereby to maintain its reactance constant over the swept frequency range; three voltage responsive means connected, respectively, (1) across said second resistor, (2) across the unknown impedance, and (3) between the junction point of said first resistor and said reactor, and said other terminal of said second resistor; each said voltage responsive means including a body pivotally mounted at the edge of said chart surface, an arm reciprocably mounted in said body, and means responsive to the energizing voltage to which the voltage responsive means is connected effective to extend and retract said arm in proportion to the magnitude of the energizing voltage; pivot means pivotally connecting the three arms adjacent their extended ends, and a stylus mounted on said pivot means effective to mark a chart disposed on said surface.

4. Apparatus for measuring an unknown impedance, comprising a chart surface; a bridge circuit including a variable reactor and a first resistor connected in series across a source of A. C. voltage; a second resistor connected to the junction point between said source and said first resistor, the other terminal of said source and the other terminal of said second resistor constituting, respectively, the connection terminals for the unknown impedance; three voltage responsive means connected, respectively (1) across said second resistor, (2) across the unknown impedance, and (3) between the junction point of said first resistor and said reactor, and said other terminal of said second resistor; each said voltage responsive means including a body pivotally mounted at the edge of said chart surface, an arm reciprocably mounted in said body, and means responsive to the energizing voltage to which the voltage responsive means is connected effective to extend and retract said arm in proportion to the magnitude of the energizing voltage; pivot means pivotally connecting the three arms adjacent their extended ends, and a stylus mounted on said pivot means effective to mark a chart disposed on said surface.

5. Apparatus for measuring an unknown impedance, comprising a bridge circuit including a variable reactor and a first resistor connected in series across a source of variable frequency A. C. voltage; a second resistor connected to the junction point between said source and said first resistor, the other terminal of said source and the other terminal of said second resistor constituting, respectively, the connection terminals for the unknown impedance; means for sweeping said source voltage thru the frequency range thereof; a link connecting said sweep frequency means to said reactor thereby to maintain its reactance constant over the swept frequency range; and three voltage responsive means connected, respectively, (1) across said second resistor, (2) across the unknown impedance, and (3) between the junction point of said first resistor and said reactor, and said other terminal of said second resistor; said voltage responsive means including three interconnected mechanical elements respectively movable in accordance with the varying voltages to indicate the value of the unknown impedance.

6. Apparatus for measuring an unknown impedance, comprising a bridge circuit including a variable reactor and a first resistor connected in series across a source of A. C. voltage; a second resistor connected to the junction point between said source and said first resistor, the other terminal of said source and the other terminal of said second resistor constituting, respectively, the connection terminals for the unknown impedance; and three voltage responsive means connected, respectively, (1) across said second resistor, (2) across the unknown impedance, and (3) between the junction point of said first resistor and said reactor, and said other terminal of said second resistor; said voltage responsive means including a plurality of interconnected mechanical elements respectively movable in accordance with the varying voltages to indicate the value of the unknown impedance.

7. Apparatus for plotting magnitude and phase of an unknown impedance comprising a chart surface, a bridge circuit adapted to include the unknown impedance, a source of variable frequency voltage connected to said circuit, means for sweeping said source voltage thru the frequency range thereof, a plurality of voltage responsive means connected respectively across different points of said circuit, including reciprocably mounted arms and driving means for extending and retracting said arms in proportion to the magnitude of the respective voltages appearing across each of said different points, said arms being pivoted together adjacent their respective extended ends, and marking means mounted to the common pivot point of said arms effective to mark a chart positioned on said surface.

8. Apparatus for measuring an unknown impedance comprising a bridge circuit adapted to include the unknown impedance, a source of variable frequency voltage, means for sweeping said source voltage thru the frequency range thereof, a link connecting said sweep frequency means to one of the members of said bridge circuit, thereby to maintain constant the impedance of said one member over the swept frequency range, a plurality of voltage responsive means connected respectively across different points of said circuit, and means for combining the voltage responses of said voltage responsive means to indicate the value of the unknown impedance.

LEO W. WILSON.

REFERENCES CITED

The following references are of record in the file of this patent:

UNITED STATES PATENTS

| Number | Name | Date |
|---|---|---|
| 2,093,103 | Taborsky | Sept. 14, 1937 |
| 2,110,523 | Geyger | Mar. 8, 1938 |
| 2,314,244 | Pratt | Mar. 16, 1943 |
| 2,380,791 | Rosencrans | July 31, 1945 |
| 2,461,286 | Kline | Feb. 8, 1949 |
| 2,537,498 | Wickesser | Jan. 9, 1951 |